US009410531B2

(12) United States Patent
Hayashi (10) Patent No.: US 9,410,531 B2
(45) Date of Patent: Aug. 9, 2016

(54) WIND TURBINE GENERATOR

(75) Inventor: Yuki Hayashi, Tokyo (JP)

(73) Assignee: THK CO., LTD., Shinagawa-ku (JP)

(*) Notice: Subject to any disclaimer, the term of this patent is extended or adjusted under 35 U.S.C. 154(b) by 459 days.

(21) Appl. No.: 13/985,200

(22) PCT Filed: Mar. 6, 2012

(86) PCT No.: PCT/JP2012/055631
§ 371 (c)(1),
(2), (4) Date: Aug. 13, 2013

(87) PCT Pub. No.: WO2012/124536
PCT Pub. Date: Sep. 20, 2012

(65) Prior Publication Data
US 2013/0323059 A1    Dec. 5, 2013

(30) Foreign Application Priority Data

Mar. 11, 2011  (JP) .................................. 2011-054265
Mar. 1, 2012  (JP) .................................. 2012-045618

(51) Int. Cl.
*F03D 7/02* (2006.01)
(52) U.S. Cl.
CPC ........... *F03D 7/0224* (2013.01); *F05B 2260/74* (2013.01); *F05B 2260/76* (2013.01); *F05B 2260/79* (2013.01); *Y02E 10/721* (2013.01); *Y02E 10/722* (2013.01); *Y02E 10/723* (2013.01)
(58) Field of Classification Search
CPC ............... F03D 7/0224; F05B 2260/74; F05B 2260/76; F05B 2260/79
USPC .............. 415/129–133, 157, 158; 416/157 R, 416/159, 163, 164, 168 R
See application file for complete search history.

(56) References Cited

U.S. PATENT DOCUMENTS

| 3,082,826 | A | * | 3/1963 | Doman | .................... | B64C 27/54 416/102 |
| 3,736,010 | A | * | 5/1973 | Larkin | .................... | B64C 27/54 16/429 |
| 5,042,967 | A | * | 8/1991 | Desjardins | .............. | B64C 27/41 416/134 A |

(Continued)

FOREIGN PATENT DOCUMENTS

| CN | 101037988 A | 9/2007 |
| CN | 101802394 A | 8/2010 |

(Continued)

OTHER PUBLICATIONS

International Search Report dated dated Jun. 5, 2012, issued in corresponding application No. PCT/JP2012/055631.

(Continued)

*Primary Examiner* — Thomas Denion
*Assistant Examiner* — Mickey France
(74) *Attorney, Agent, or Firm* — Westerman, Hattori, Daniels & Adrian, LLP (57) ABSTRACT

A wind turbine generator includes a plurality of blades that radially protrude from a rotor head about an axis of a main shaft, and a pitch axis rotation mechanism that is provided in the rotor head to rotate the blade about a pitch axis P. The pitch axis rotation mechanism includes an actuator that is supported by the rotor head, and has a stretchable rod which is supported by the rotor head, and a link structure that links the rod to the blade. The actuator extends on the axis of the main shaft.

5 Claims, 11 Drawing Sheets (56) References Cited

U.S. PATENT DOCUMENTS 5,554,899 A * 9/1996 Teramachi ............... B25J 9/102
                                                              310/20
2005/0200135 A1    9/2005 Shibata et al.
2011/0255969 A1 * 10/2011 Hallstrom ............. F03D 7/0224
                                                              416/26

FOREIGN PATENT DOCUMENTS

| DE | 102007022511 A1 | 11/2008 |
|---|---|---|
| EP | 1126163 A1 | 8/2001 |
| EP | 1998042 A1 | 12/2008 |
| JP | 08-035482 A | 2/1996 |
| JP | 2003-206846 A | 7/2003 |
| JP | 2005-113823 A | 4/2005 |
| JP | 2006-046107 A | 2/2006 |

OTHER PUBLICATIONS

Office Action dated Jun. 30, 2015, issued in counterpart Chinese Application No. 201280012045.X, with English translation. (12 pages).

* cited by examiner

WIND TURBINE GENERATOR

TECHNICAL FIELD

The present invention relates to a wind turbine generator.

Priority is claimed on Japanese Patent Application No. 2011-054265, filed Mar. 11, 2011, and Japanese Patent Application No. 2012-45618, filed Mar. 1, 2012, the contents of which are incorporated herein by reference.

BACKGROUND ART

PTL 1 discloses a wind turbine generator that performs power generation using wind flow.

The wind turbine generator includes a tower that stands on the ground surface, a nacelle, a main shaft, a rotor head, a plurality of blades, and a pitch axis rotation mechanism.

The nacelle (rear nacelle) is provided on the tower. The main shaft is rotatably provided in the nacelle. The rotor head (front nacelle) is provided at a front tip of the main shaft, and projects from the nacelle. The plurality of blades radially protrude, from the rotor head about an axis of the main shaft. The pitch axis rotation mechanism (variable pitch device) rotates the blades about a pitch axis thereof.

In the wind turbine generator according to the Patent Document 1, the pitch axis rotation mechanism includes an actuator (hydraulic cylinder) that has an actuator main body which is fixed to the nacelle, and a rod which is stretchable from the actuator main body, and a link structure that links the rod with the blades.

The link structure includes a pitch control shaft that is connected to a front tip of the rod via a rod bearing section, and a plurality of joints (links and arms) that connects the pitch control shaft with the blades.

The pitch control shaft reaches the inside of the rotor head through a power generator of the nacelle and the main shaft. The pitch control shaft can reciprocate in a direction of the axis of the main shaft by the stretching of the rod with respect to the actuator main body. The pitch control shaft can be rotated with respect to the rod by the rod bearing section.

CITATION LIST

Patent Literature

[PTL 1] Japanese Unexamined Patent Application, First Publication No. 2006-46107

SUMMARY OF INVENTION

Technical Problem

However, wind turbine generators according to the related art have the following disadvantages.

A link structure that transmits stretching of a rod of an actuator to blades has a large number of components along with a complex structure. Due to the complex structure, much time is consumed for assembly and maintenance (hereinafter referred to as "assembly and so forth").

Since a power generator, a main shaft, and a rotor head are provided between the actuator and the blade, the distance between the actuator and the blade is lengthened. The total length of the rod connecting the above components and the total length of the link structure increase. Therefore, there is a concern that the rod and the link structure could buckle due to a large load (thrust) in an axial direction that is transmitted from the actuator and the blade.

The actuator has to be provided at a rotation structure end (end section opposite to the rotor head in a structure that integrally rotates with the main shaft about an axis of the main shaft). Therefore, a slip ring and a hydraulic rotary joint cannot be provided. Thus, a member for ensuring safety and durability of devices such as a sensor detecting a position of the rotation about a pitch axis of the blade and a hydraulic brake controlling the rotation about the pitch axis of the blade cannot be provided in the rotor head.

The present invention has been made in view of the foregoing disadvantages, and an object thereof is to provide a wind turbine generator that has improved safety and durability.

Solution to Problem

A wind turbine generator according to the present invention includes a nacelle that is disposed on a tower, a rotatable main shaft that is disposed in the nacelle, a rotor head that is disposed at a tip end of the main shaft and projects from the nacelle, a plurality of blades that radially protrude from the rotor head about an axis of the main shaft, and a pitch axis rotation mechanism that is provided in the rotor head to rotate the blade about a pitch axis. The pitch axis rotation mechanism includes an actuator that has an actuator main body which is supported by the rotor head, and a rod that is stretchable from the actuator main body, and a link structure that links the rod to the blade. The actuator extends on the axis of the main shaft.

Advantageous Effects of Invention

According to the present invention, it is possible to improve safety and durability of the wind turbine generator.

DESCRIPTION OF EMBODIMENTS

Hereinafter, a wind turbine generator 1 according to an embodiment of the present invention will be described with reference to FIGS. 1 to 11.

Figure 1:
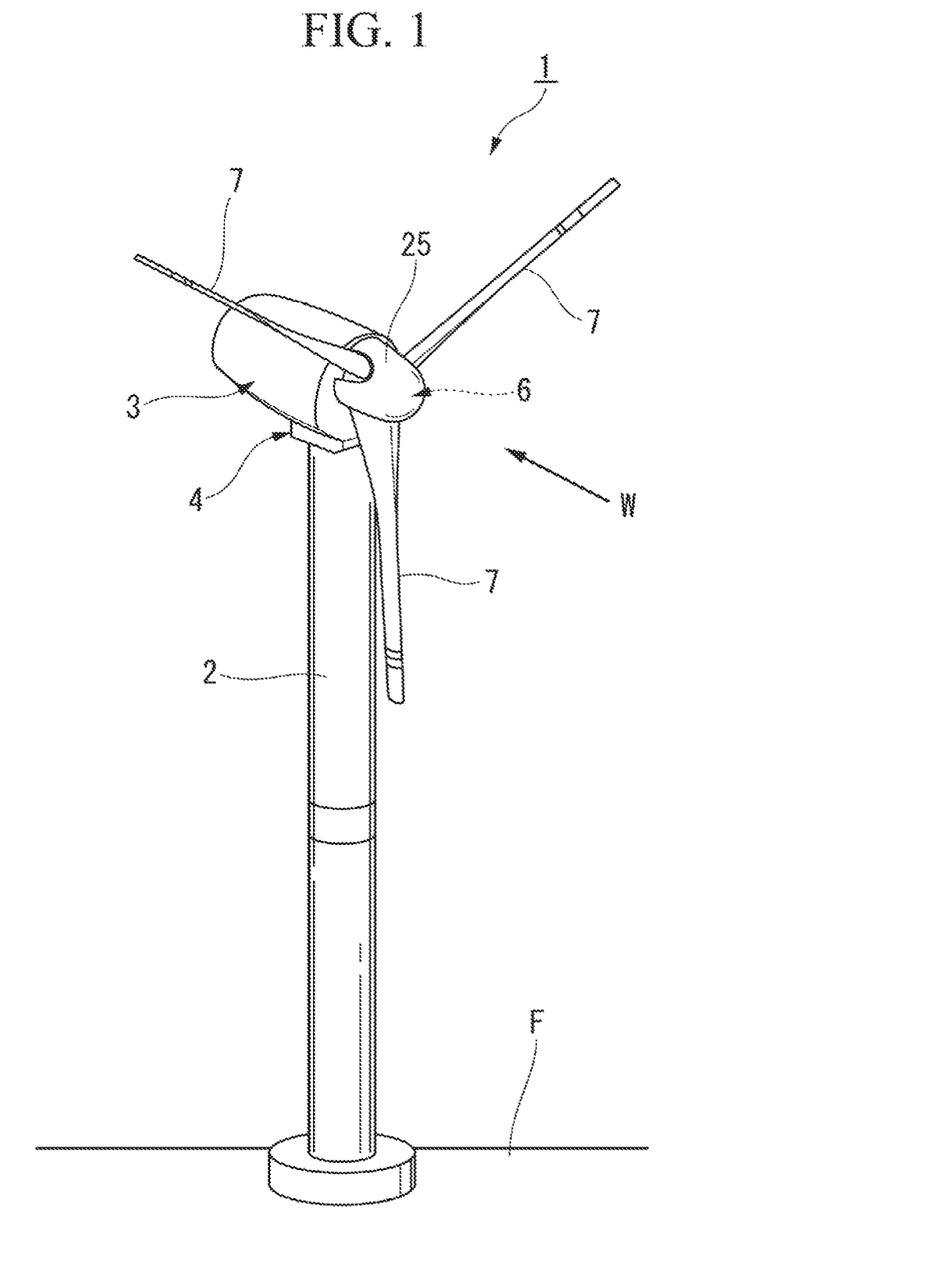
FIG. 1 is an external view illustrating a wind turbine generator 1 according to an embodiment of the present invention.

As illustrated in FIG. 1, the wind turbine generator 1 according to the present invention is a horizontal axis type wind turbine generator. The wind turbine generator 1 includes a tower 2, a nacelle 3, and a rotational structure 4.

The tower 2 stands on a ground surface F. The nacelle 3 is disposed on the tower 2. The rotational structure 4 turns the nacelle 3 about an axis of the tower 2 with respect to the tower 2 (about a yaw axis).

Figure 2:
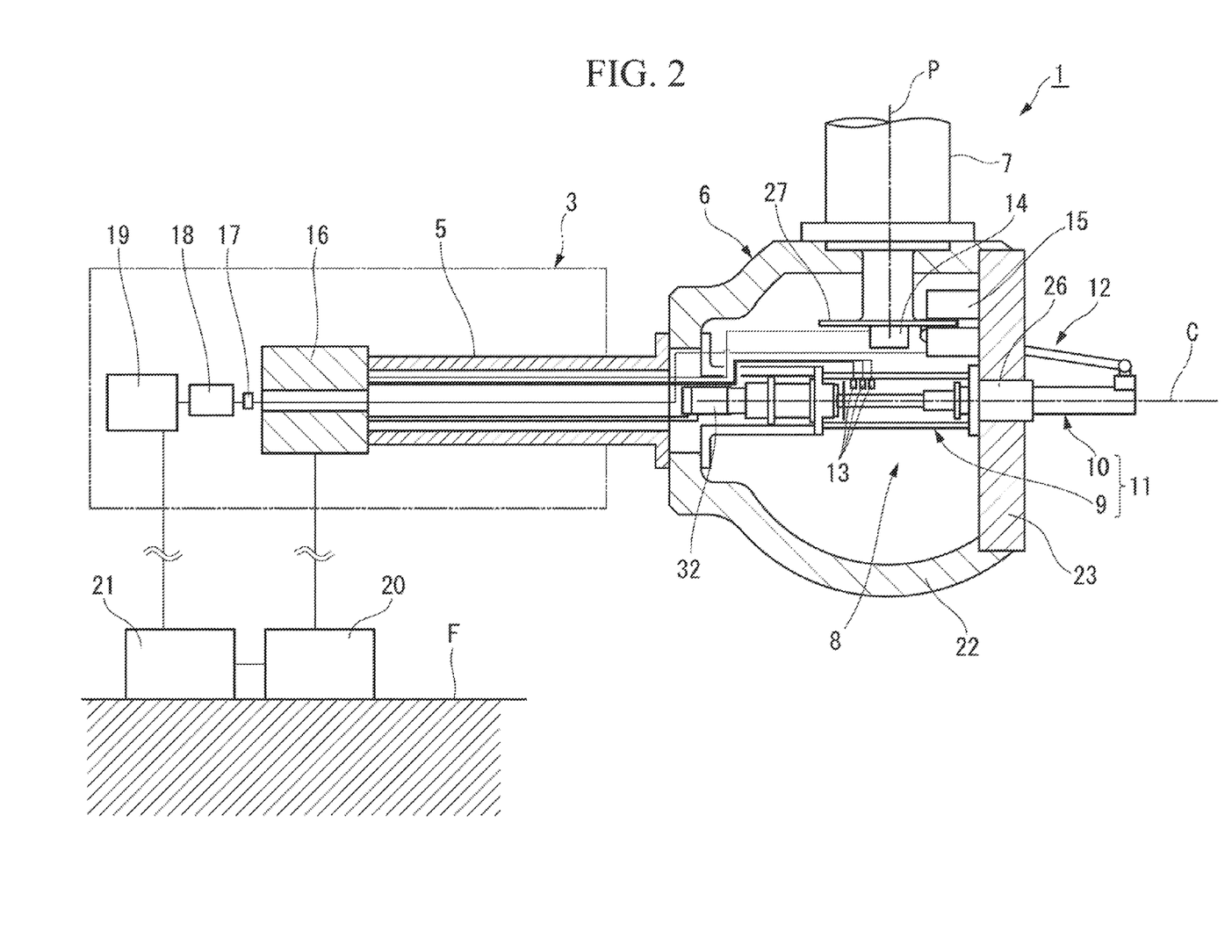
FIG. 2 is an explanatory view of a structure of the wind turbine generator 1.

As illustrated in FIGS. 1 and 2, the wind turbine generator 1 includes a main shaft 5, a rotor head 6, a plurality of blades 7, and a pitch axis rotation mechanism 8. The main shaft 5 is disposed so as to be rotatable with respect to the nacelle 3. The rotor head 6 is disposed at a tip end of the main shaft 5, and projects from the nacelle 3. The plurality of blades 7 radially protrude from the rotor head 6 about an axis C of the main shaft 5. The pitch axis rotation mechanism 8 is provided in the rotor head 6 to rotate the blades 7 about a pitch axis P thereof.

Hereinafter, the rotor head 6 side (right-hand side in FIG. 2) along a direction of the axis C of the main shaft 5 is referred to as a tip end side, and a side opposite to the rotor head 6 (left-hand side in FIG. 2) is referred to as a base end side.

The plurality of blades 7, which form a windmill section, are set at a predetermined height from the ground surface F by the tower 2. In this state, the plurality of blades 7 receives wind W and rotates about the axis C of the main shaft 5.

A power generator (not illustrated) is disposed on the base end side of the main shaft 5 in the nacelle 3. The power generator generates power by converting mechanical energy obtained by the rotation of the main shaft 5 about the axis C into electrical energy.

In FIG. 2, the pitch axis rotation mechanism 8 includes an actuator 11, and a link structure 12 that links a rod 10 to the blade 7. The actuator 11 has an actuator main body 9 that is supported by the rotor head 6, and the rod 10 that is stretchable from the actuator main body 9.

As illustrated in FIG. 2, a plurality of proximity switches 13, an encoder 14, and a hydraulic brake 15 are disposed in the rotor head 6. The proximity switch 13 is a sensor that detects a stretching position of the rod 10 with respect to the actuator main body 9. The encoder 14 is a sensor that detects a rotational position of the blade 7 about the pitch axis P. The hydraulic brake 15 is a hydraulic brake that controls a rotation of the blade 7 about the pitch axis P.

A slip ring 16, a hydraulic rotary joint (flexible joint) 17, a hydraulic booster 18, and a small air compressor 19 are disposed in the nacelle 3. The hydraulic booster 18 and the small air compressor 19 may be hydraulic pumps.

From the actuator 11, a power cable of a motor 32 that will be described hereinafter, a cable of the proximity switch 13, and a cable of the encoder 14 are drawn out. These cables are connected to the slip ring 16 that is disposed in a base end section of the main shaft 5 through the cylindrical main shaft 5 from a base end section of the rotor head 6.

The hydraulic brake 15 is connected to the hydraulic rotary joint 17 from the base end section of the rotor head 6 through the main shaft 5 and through the cylindrical slip ring 16. The hydraulic booster 18 is connected to a base end side of the hydraulic rotary joint 17. The small air compressor 19 is connected to a base end side of the hydraulic booster 18.

A driver 20 is installed in a lower section of the tower 2 that is the ground surface F side. A controller 21 is connected to the driver 20. The driver 20 is connected to the slip ring 16. The controller 21 is connected to the small air compressor 19.

The driver 20 does not necessarily have to be disposed on the ground. For example, the driver may be disposed in the nacelle 3.

Figure 3:
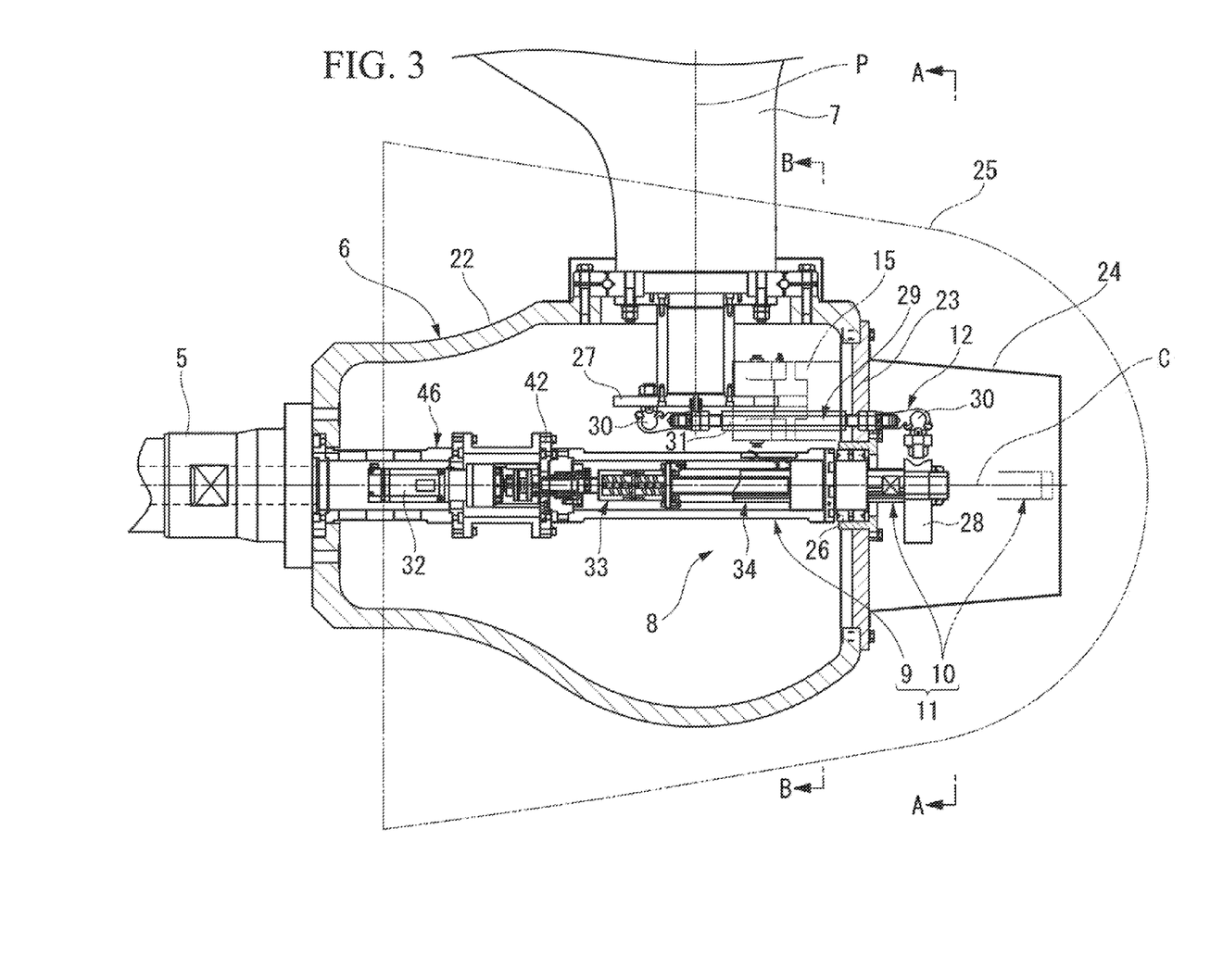
FIG. 3 is a side cross-sectional view illustrating an internal structure of a rotor head 6.
Figure 4:
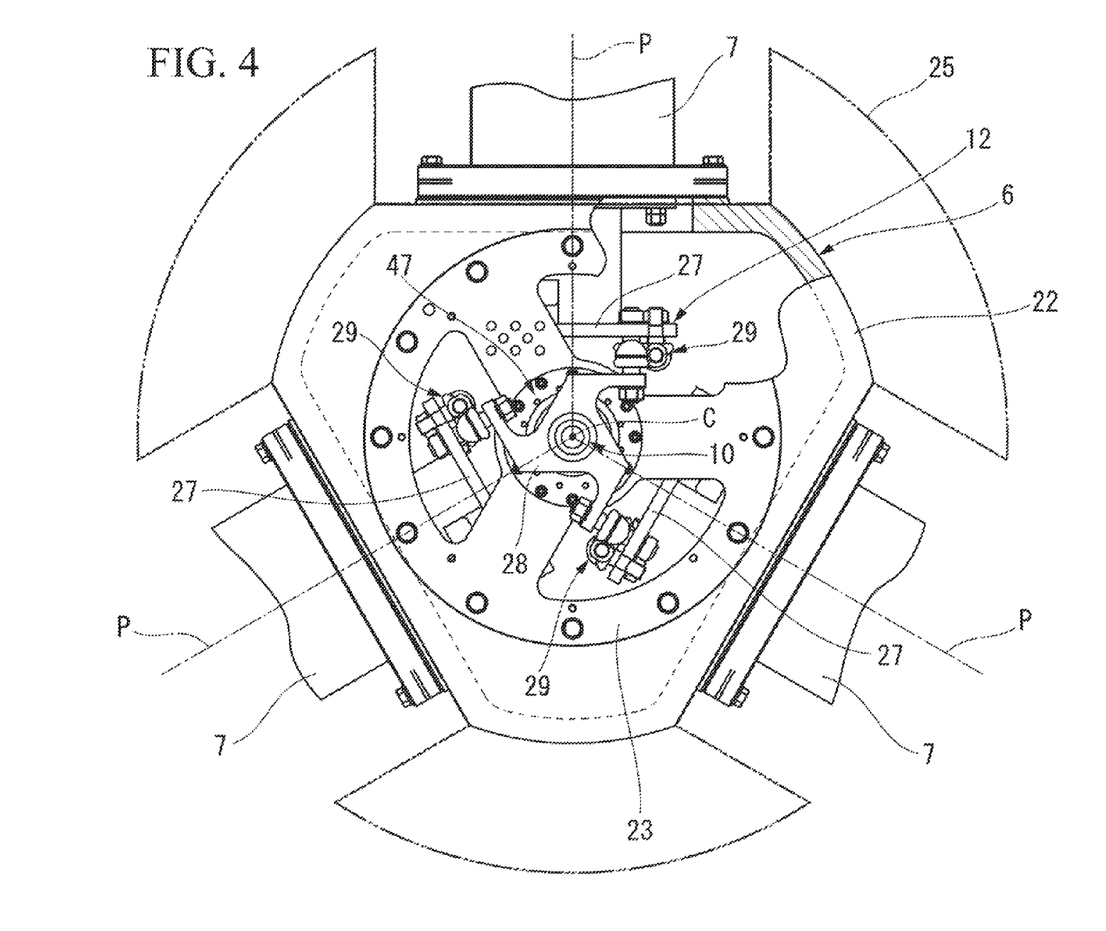
FIG. 4 is a front view illustrating the internal structure of the rotor head 6 (a cross-sectional view taken along line A-A of FIG. 3 and a partial transparent view of the rotor head 6).
Figure 5:
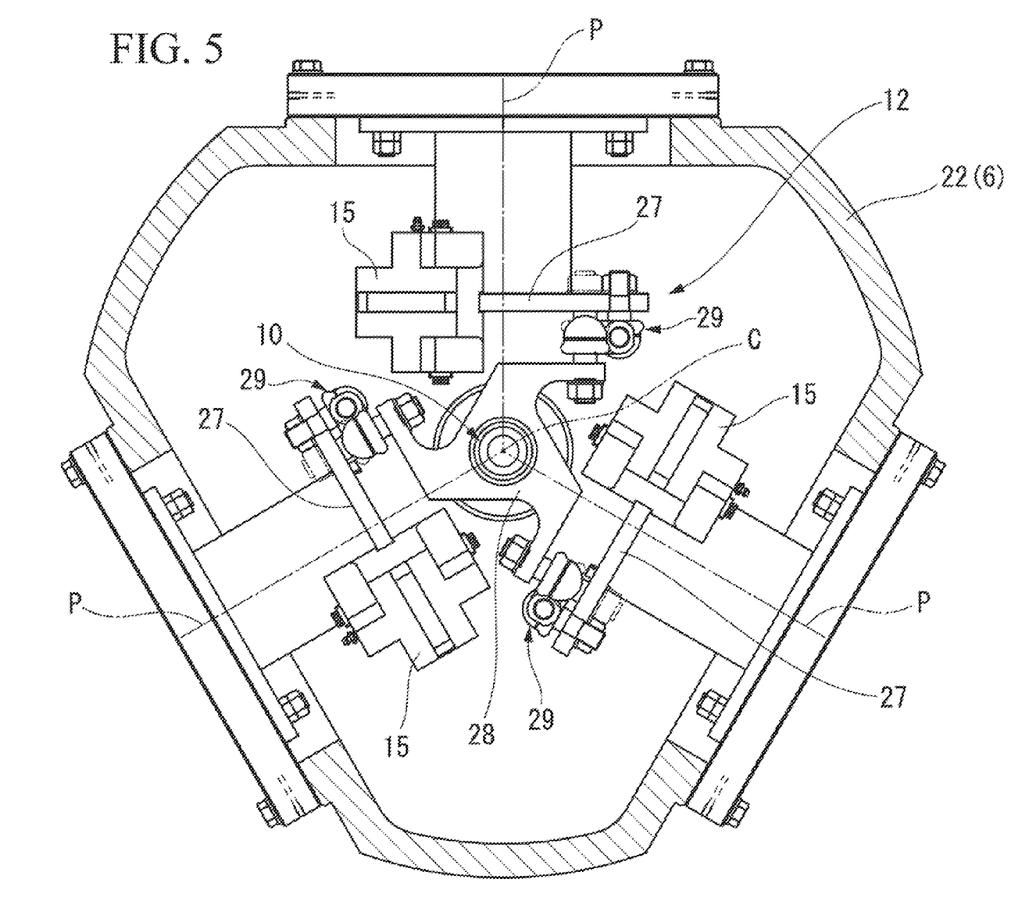
FIG. 5 is a front cross-sectional view illustrating the internal structure of the rotor head 6 (a cross-sectional view taken along line B-B of FIG. 3).

As illustrated in FIGS. 3 and 4, the rotor head 6 includes a cylindrical rotor head main body 22 that has a hollow inner space, and a disk-shaped rotor head lid 23 that is disposed in a tip end section of the rotor head main body 22.

In the wind turbine generator 1, the three blades 7 are provided about the axis C at an equal distance in a circumferential direction. With respect thereto, a cross-sectional shape of the rotor head main body 22 is an approximately triangular shape (refer to FIG. 4).

The blades 7 are supported by the rotor head main body 22 in such a manner as to be rotatable about the pitch axis P. Disk-shaped disks 27 that are disposed in the rotor head 6 are integrally linked to the blades 7.

As illustrated in FIG. 3, a rod cover 24 is disposed on a surface facing a tip end side of the rotor head lid 23.

The rod cover 24 covers the rod 10 and a tip end side portion of the link structure 12 that is linked to the rod 10. The rod 10 projects from the rotor head lid 23 toward the tip end side.

The rotor head cover 25 is disposed in such a manner as to cover the rotor head 6 and the rod cover 24.

As illustrated in FIG. 3, the actuator 11 extends on the axis C of the main shaft 5.

A base end section of the actuator main body 9 (one side of the actuator main body 9) is fixed to a base end section of the rotor head main body 22. A tip end section of the actuator main body 9 (the other side of the actuator main body 9) is supported by the rotor head lid 23 via a spherical bearing 26.

The rod 10 of the actuator 11 protrudes from the actuator main body 9 toward the tip end side. The amount by which the rod 10 projects toward the tip end side is changeable. Therefore, the rod 10 is capable of moving along the direction of the axis C of the main shaft 5 with respect to the actuator main body 9.

A structure of the actuator 11 will be described in detail hereinafter.

As illustrated in FIGS. 3 to 6, the link structure 12 includes a link angle 28 that is disposed in a tip end section of the rod 10, and link bars 29 that link the link angle 28 with the disks 27 of the blades 7.

The link bar 29 includes a link bar main body 31 that extends along the direction of the axis C, and link bearings 30 that are disposed in both end sections of the link bar main body 31. The link bearing 30 connects the link angle 28 or the disk 27 with the link bar main body 31 in a relatively rotatable manner.

Figure 6:
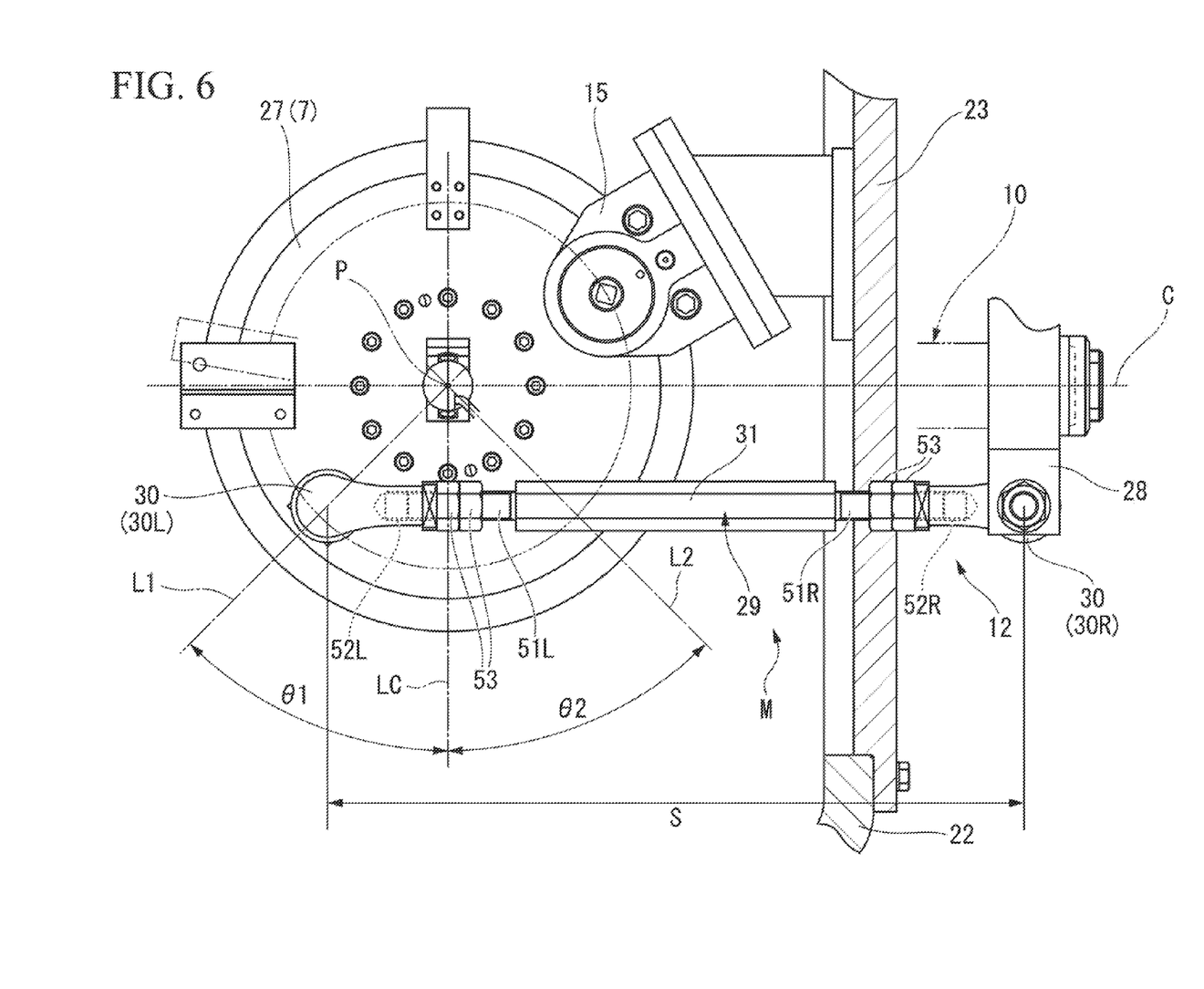
FIG. 6 is a view illustrating a disk 27 of a blade 7 seen from a pitch axis P direction (an explanatory view of a link structure 12).

FIG. 6 illustrates a state where the projection amount of the rod 10 with respect to the actuator main body 9 is minimized. In this state, an angle θ1 that is formed by a joint between the link bar 29 and the disk 27 (center of the link bearing 30), an imaginary line L1 through the pitch axis P, and an imaginary line LC which is perpendicular to the axis C is 45°.

An imaginary line L2 is an imaginary line going through the joint and the pitch axis P in a state where the projection amount of the rod 10 with respect to the actuator main body 9 is maximized. An angle θ2 that is formed by the imaginary line L2 and the imaginary line LC is 45°.

As described above, the joint between the link bar 29 and the disk 27 is capable of rotating (swinging) about the pitch axis P between the imaginary line L1 and the imaginary line L2 as the rod 10 stretches with the imaginary line LC being in the middle of the range of the rotation (as a reference).

Each of the link bars 29 includes a length adjustment mechanism M.

Figure 7:
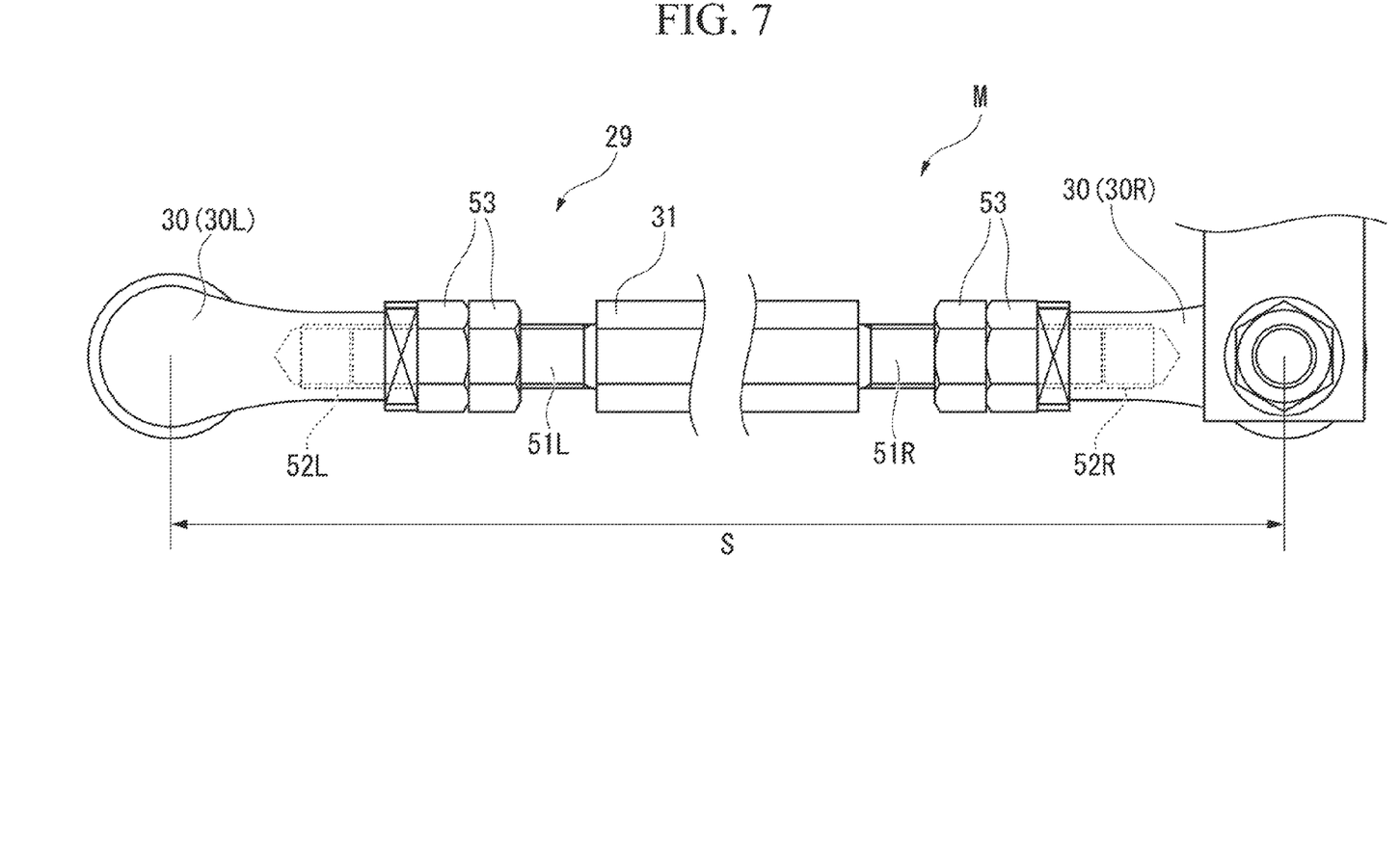
FIG. 7 is a view illustrating a length adjustment mechanism M of a link bar 29.

As illustrated in FIGS. 6 and 7, an externally threaded shaft 51L and an externally threaded shaft 51R are formed at both ends of the link bar main body 31. The externally threaded shaft 51L is a left-hand thread (counterclockwise thread). The externally threaded shaft 51R is a right-hand thread (clockwise thread).

An internal thread 52L, which is a left-hand thread, is formed in the link bearing 30 (30L) that is linked to the disk 27. An internal thread 52R, which is a right-hand thread, is formed in the link bearing 30 (30R) that is linked to the link angle 28.

The internal thread 52L of the link bearing 30L is fitted into the externally threaded shaft 51L of the link bar main body 31. The internal thread 52R of the link bearing 30R is fitted into the externally threaded shaft 51R of the link bar main body 31.

In the externally threaded shaft 51L and the externally threaded shaft 51R, a pair of locking nuts 53 (double nuts) are respectively provided at positions in contact with end faces of the link bearing 30 (30R and 30L).

When the link bar main body 31 is axially rotated in a state where the nut 53 is separated from the end face of the link bearing 30, it is possible to change (adjust) the length (link length) S of the link bar 29.

After adjusting the length S of the link bar 29, it is possible to fix the length S of the link bar 29 by pushing the nuts 53 to the respective end faces of the link bearing 30 (30R and 30L).

In this manner, each of the link bars 29 includes the length adjustment mechanism M.

The blade 7 is integrally linked to the disk 27. A mounting angle of the disk 27 with respect to the blades 7 (angle of the rotation about the pitch axis P) differs in every blade 7. Therefore, the three blades 7 have different (various) pitch angles in a case where the three link bars 29 have the same length S. When the pitch angles of the three blades 7 are different, the power generation efficiency of the wind turbine generator 1 decreases significantly.

Accordingly, the length S of each link bar 29 is adjusted with the length adjustment mechanism M, and the pitch angles of the three blades 7 are matched to a predetermined angle. For example, the pitch angles of all of the three blades 7 are matched to 0° in a state where the projection amount of the rod 10 with respect to the actuator main body 9 is minimized.

The mounting angle of the disk 27 with respect to the blade 7 is measured in advance, before assembly, for each blade 7. The length S of each link bar 29 is adjusted before the assembly, using the adjustment mechanism M, according to the measurement results. Therefore, it is unnecessary to adjust the length S of the link bar 29 on the tower 2 during the assembly of the wind turbine generator 1.

In this manner, in the wind turbine generator 1, the pitch angles of the three blades 7 are matched by using the length adjustment mechanism M. Therefore, it is possible to prevent a decrease in power generation efficiency.

Figure 8:
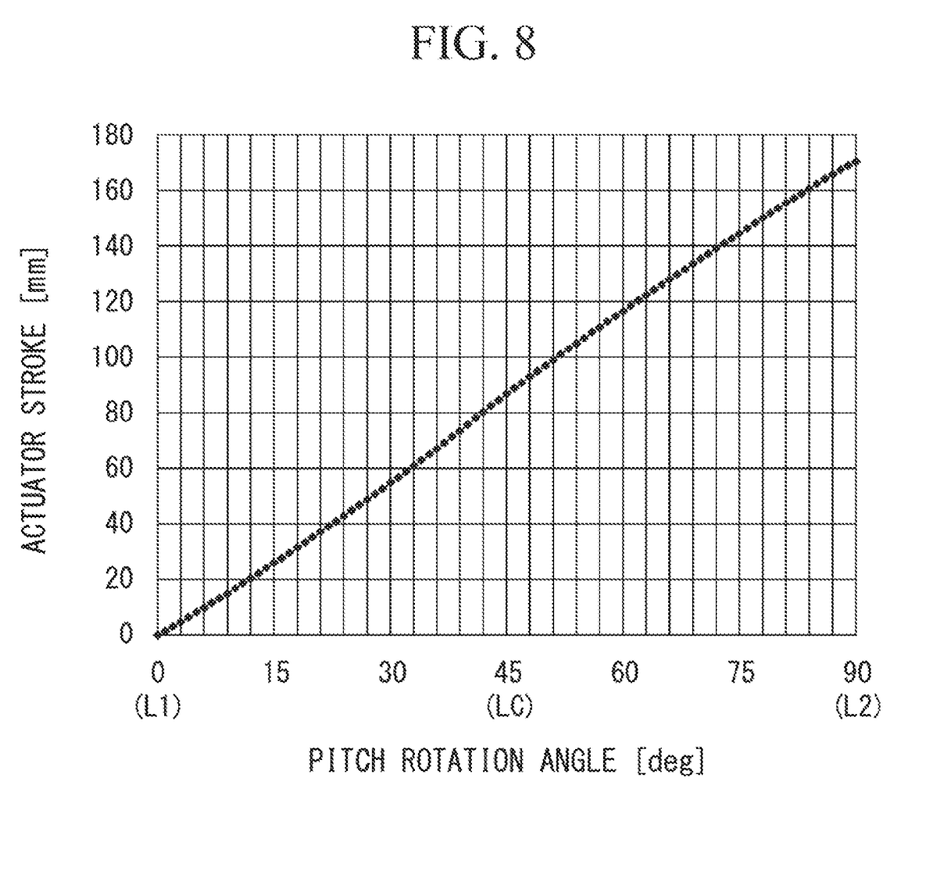
FIG. 8 is a graph illustrating a relationship between an actuator stroke and a pitch rotation angle.

As seen in FIG. 8, a graph illustrating a relationship between the projection amount of the rod 10 and the amount of the rotation of the disk 27 about the pitch axis P shows a straight line. In the graph of FIG. 8, the horizontal axis represents the pitch rotation angle, and the vertical axis represents the actuator stroke.

Figure 9:
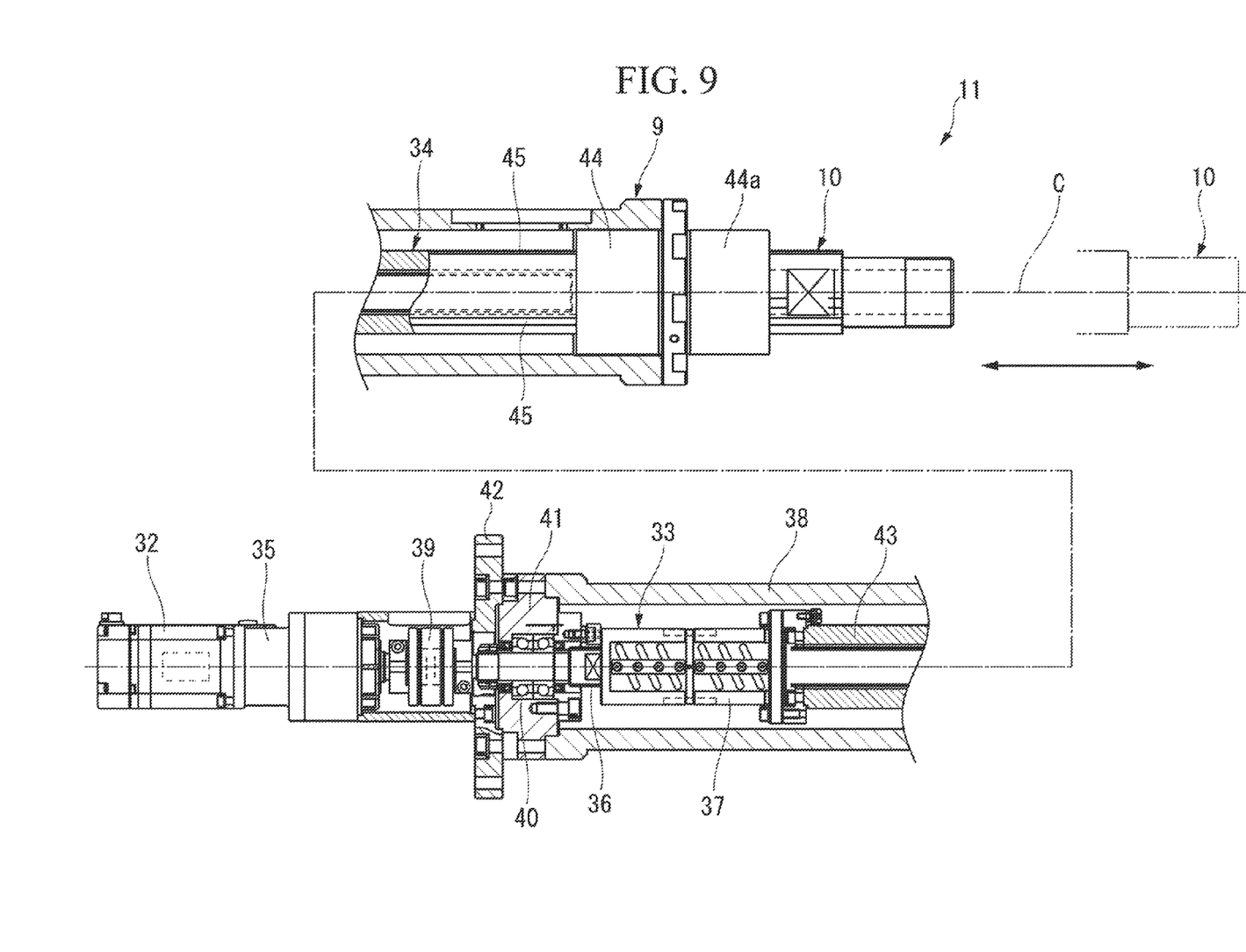
FIG. 9 is a side cross-sectional view illustrating a structure of an actuator 11.

As illustrated in FIG. 9, the actuator 11 includes the electrically-driven motor 32, a ball screw 33, a ball spline 34, and a casing 38.

The ball screw 33 converts energy of a rotational motion of the motor 32 into energy of a linear motion along the direction of the axis C of the main shaft 5. The ball spline 34 is linked to the ball screw 33, and linearly guides the rod 10 in the direction of the axis C of the main shaft 5 with respect to the actuator main body 9. The casing 38 is formed in a cylindrical shape so as to cover the ball screw 33 and the ball spline 34.

A reduction gear 35 is disposed in a tip end section of the motor 32. High thrust can be obtained when the motor 32 is a geared motor with a reduction gear and belt-loop specifications. The reduction gear 35 is linked to a threaded shaft 36 of the ball screw 33 via a coupling 39.

The ball screw 33 includes a threaded shaft 36 that extends along the direction of the axis C, and a cylindrical ball screw nut 37 into which the threaded shaft 36 is inserted.

On an outer circumferential surface of the threaded shaft 36, a rolling element rolling surface (not illustrated) that is a spiral groove which extends in the direction of the axis C while orbiting about the axis C is formed. In the ball screw nut 37, an endless infinite circulation passage (not illustrated) that includes a load rolling element rolling surface which is a spiral groove opposing the rolling element rolling surface is formed. In the infinite circulation passage, a plurality of balls (rolling elements) are held to be capable of circulating (not illustrated).

The ball screw nut 37 is assembled to the threaded shaft 36 via the balls. By the rolling and circulation of the balls, the ball screw nut 37 is capable of reciprocating in the direction of the axis C with respect to the threaded shaft 36. A base end section of the threaded shaft 36 is rotatably supported by an angular bearing 40.

The angular bearing 40 is supported by a housing 41 that is disposed on a base end side of the casing 38. A flange 42 is disposed on a base end side of the housing 41. The casing 38, the housing 41, and the flange 42 are integrally fixed to each other.

The ball spline 34 includes a spline shaft 43, and a spline nut 44.

The spline shaft 43 is linked to a tip end section of the ball screw nut 37, and extends along the direction of the axis C. The spline shaft 43 is formed in a cylindrical shape, and the threaded shaft 36 is inserted thereinto. The spline nut 44 is formed in a cylindrical shape, and the spline shaft 43 is inserted thereinto. The spline nut 44 is fixed to a tip end section of the casing 38. A tip end portion 44a of the spline nut 44 projects from the casing 38 toward the tip end side.

Figure 10:
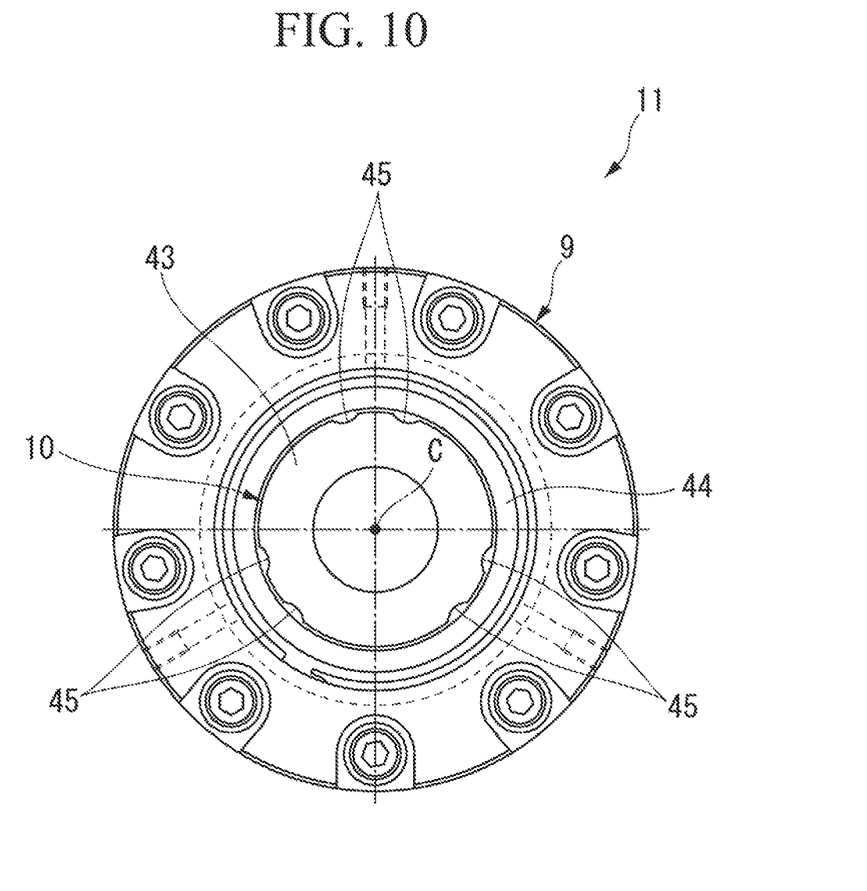
FIG. 10 is a front view illustrating the actuator 11 seen from an axis C direction.

As illustrated in FIGS. 9 and 10, a plurality of rolling element rolling surfaces 45 that are linear grooves which extend along the direction of the axis C are formed on an outer circumferential surface of the spline shaft 43. In the spline nut 44, an endless infinite circulation passage (not illustrated) that includes a load rolling element rolling surface which is a linear groove opposing the rolling element rolling surface 45 is formed. In the infinite circulation passage, a plurality of balls (not illustrated) are held to be capable of circulating.

The spline nut 44 is assembled to the spline shaft 43 via the balls. By the rolling and circulation of the balls, the spline shaft 43 is capable of reciprocating in the direction of the axis C with respect to the spline nut 44. The spline shaft 43 is the rod 10 that moves in the direction of the axis C with respect to the actuator main body 9.

As illustrated in FIG. 3, a cylindrical stand 46 that is linked to a base end side of the flange 42 and covers the motor 32 is disposed in the actuator main body 9. A base end section of the stand 46 is fixed to the base end section of the rotor head main body 22 by a bolt or the like.

In this manner, every load in axial, thrust, and bending directions is configured to be received in the base end section of the actuator main body 9. An inner side of the stand 46 and an inner side of the main shaft 5 communicate with each other.

Figure 11:
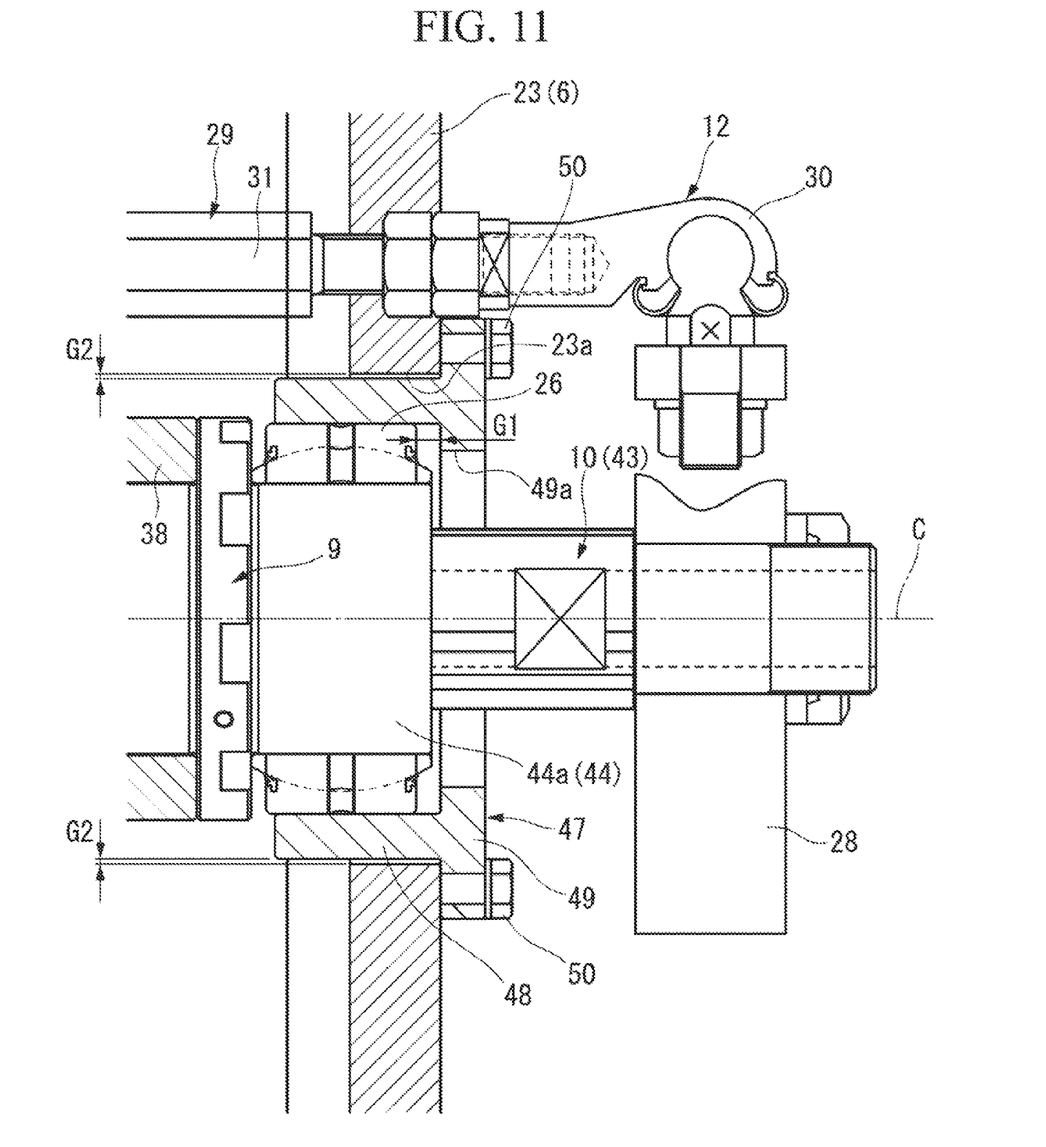
FIG. 11 is an enlarged side cross-sectional view of the vicinity of a tip end section of an actuator main body 9.

As illustrated in FIG. 11, the spherical bearing 26 is fitted into the tip end portion 44a of the spline nut 44 of the actuator main body 9.

The spherical bearing 26 is disposed in the rotor head lid 23 via a spherical bearing flange 47. A mounting hole 23a that is bored in the direction of the axis C is formed at a center of the rotor head lid 23. The spherical bearing flange 47 is mounted on the mounting hole 23a. The spherical bearing 26 is a structure supporting the actuator 11, which is a beam of the rotor head 6, and receives the load in the thrust direction.

The spherical bearing flange 47 includes a cylindrical section 48 that is inserted into the mounting hole 23a, and a disk-shaped flange section 49 that is formed in a tip end section of the cylindrical section 48, and is fixed to a surface which faces the tip end side of the rotor head lid 23.

The spherical bearing 26 is inserted into the cylindrical section 48. The spherical bearing 26 is slidable in the direction of the axis C with respect to the cylindrical section 48. Fitting of the cylindrical section 48 and the spherical bearing 26 and fitting of the spherical bearing 26 and the spline nut 44 has the clearance (interference) in which relative displacement is possible to the direction of the axis C.

In a middle of the flange section 49, a through hole 49a is bored in the direction of the axis C. The rod 10 is inserted into the through hole 49a.

A gap G1 is provided between a surface facing a tip end side of the spherical bearing 26 and a surface facing a base end side of the flange section 49. Therefore, the spherical bearing 26 is movable in the direction of the axis C of the main shaft 5 with respect to the rotor head 6.

A gap G2 is provided between an outer circumferential surface of the cylindrical section 48 and an inner circumferential surface of the mounting hole 23a. Therefore, the spherical bearing flange 47 and the spherical bearing 26 are movable in a radial direction that is perpendicular to the direction of the axis C with respect to the rotor head 6.

When the assembly and so forth is completed, the spherical bearing flange 47 and the rotor head lid 23 are fixed to each other by a bolt 50, and relative movement in the radial direction is encumbered.

As described above, in the wind turbine generator 1 according to the present embodiment, the pitch axis rotation mechanism 8 that rotates the blades 7 about the pitch axis P is provided inside the rotor head 6. The actuator 11 of the pitch axis rotation mechanism 8 extends on the axis C of the main shaft 5. The rod 10 of the actuator 11 is stretchable along the direction of the axis C of the main shaft 5 with respect to the actuator main body 9.

The following significant effects are obtained by the wind turbine generator 1.

In the wind turbine generator 1, the actuator 11 is disposed inside the rotor head 6. Accordingly, a distance between the actuator 11 and the blade 7 can be shortened (refer to FIG. 3). A total length of the rod 10 of the actuator 11 and a total length of the link structure 12 can be shortened. As such, it is possible to reduce the number of components of the link structure 12 to simplify the configuration.

As a result, the assembly and so forth of the wind turbine generator 1 are facilitated. Since the total length of the rod 10 and the total length of the link structure 12 can be shortened, buckling of the rod 10 and the link bar 29 of the link structure 12 can be prevented by a large load (thrust) that is transmitted from the actuator 11 and the blades 7 toward the direction of the axis C.

In the wind turbine generator 1, the actuator 11 is disposed inside the rotor head 6. Therefore, it is possible to install the slip ring 16 and the hydraulic rotary joint 17 in the base end section (rotation structure end) of the main shaft 5 that rotates with the rotor head 6 (refer to FIG. 2).

As such, the motor 32 of the actuator 11 can be disposed inside the rotor head 6. The sensor such as the proximity switch 13 and the encoder 14, and the hydraulic brake 15 can be disposed in the rotor head 6.

Therefore, safety and durability of the wind turbine generator 1 can be improved.

In the wind turbine generator 1, the actuator 11 is placed at the center of rotation of the rotor head 6, that is, on the axis C of the main shaft 5. Therefore, deviation of the center (eccentricity) of the rotor head 6 is controlled, and vibration caused by the eccentricity is reduced.

The stretching of the rod 10 of the actuator 11 is performed on the axis C of the main shaft 5. Therefore, no eccentricity results from the stretching of the rod 10.

Accordingly, the rotor head 6 rotates in a stable manner over a long period of time. Because of the stable rotation of the rotor head 6, the amount of balancers installed for rotation balance can be reduced.

As illustrated in FIG. 11, according to the wind turbine generator 1, the tip end section of the actuator main body 9 is supported by the rotor head 6 via the spherical bearing 26. Accordingly, it is possible to cancel deflection caused by misalignment.

Since the gap G2 is formed, the spherical bearing 26 is movable in the radial direction that is perpendicular to the direction of the axis C of the main shaft 5 with respect to the rotor head 6. Accordingly, it is possible to cancel deflection caused by misalignment.

Since the gap G1 is formed, the spherical bearing 26 is movable in the direction of the axis C of the main shaft 5 with respect to the rotor head 6. Accordingly, when the actuator main body 9 and so forth stretches in the direction of the axis C through thermal expansion (contraction), the stretching can be absorbed.

In the wind turbine generator 1, the vibration of the rotor head 6 and occurrence of stress on members such as the spherical bearing 26 are prevented. Therefore, power can be generated in a stable manner.

In the wind turbine generator 1, a mounting error caused by the misalignment and a displacement error caused by the thermal expansion can be cancelled or absorbed. Accordingly, the accuracy with which the components are processed does not necessarily have to be high, and processes such as adjustment can be reduced during the assembly. As such, productivity can be improved, and manufacturing costs can be reduced.

In the wind turbine generator 1, the actuator 11 includes the motor 32, the ball screw 33, and the ball spline 34 (refer to FIG. 3). Therefore, the following effects are obtained.

Assembly of the actuator 11 of the wind turbine generator 1 is easier than assembly of actuators of the related art such as hydraulic cylinders. The actuator 11 does not leak oil or the like, and allows easy maintenance.

The actuator 11 uses the electrically-driven motor 32 as a driving source, and thus has excellent responsiveness. The wind turbine generator 1 is driven by the natural wind W, whose direction and speed change significantly, and thus the actuator 11 of the pitch axis rotation mechanism 8 is required to have high responsiveness. The actuator 11 (the electrically-driven motor 32) can easily meet the demand.

The wind turbine generator 1 uses the ball screw 33 as a speed reduction mechanism for the motor 32. Therefore, high thrust and low backlash can be achieved. An external force that the blades 7 of the wind turbine generator 1 receive from the wind W is extremely large. In order to rotate the blades 7 about the pitch axis P, the actuator 11 of the pitch axis rotation mechanism 8 is required to have high thrust and low backlash. The actuator 11 (the ball screw 33) can easily meet the demand.

In the wind turbine generator 1, the ball spline 34 is linked to the ball screw 33, and thus the rotation of the ball screw nut 37 of the ball screw 33 about the axis C with respect to the casing 38 is controlled. Therefore, the spline shaft 43, which is the rod 10, is efficiently guided in the direction of the axis C with high accuracy.

In the wind turbine generator 1, the rod 10 is stretched with respect to the actuator main body 9 by a rolling guide structure of the ball screw 33 and the ball spline 34 alone. Accordingly, accuracy of the stretching amount of the rod 10 is sufficient. Therefore, resistance caused by the stretching is small, and high efficiency is achieved. As a result, the capacity of the motor 32 can be decreased, and running costs (power consumption) of the wind turbine generator 1 can be reduced.

In the wind turbine generator 1, the stretching of the rod 10 causes the joint between the link bar 29 and the disk 27 (the center of the link bearing 30) to rotate about the pitch axis P (refer to FIG. 6) between the imaginary line L1 and the imaginary line L2 with the imaginary line LC that is perpendicular to the axis C being in the middle of the range of the rotation. Accordingly, the following effects are obtained by the wind turbine generator 1.

As illustrated in FIG. 8, the graph illustrating the relationship between the projection amount of the rod 10 and the amount of the rotation of the disk 27 about the pitch axis P has a straight line, showing a substantially proportional relationship. In the graph, a position where the joint is placed on the imaginary line LC (middle section of the graph) is an inflection point connecting a concave curve with a convex curve ahead of and behind this position of the graph.

Therefore, the thrust of the stretching of the rod 10 along the direction of the axis C is converted, with high efficiency, into rotation torque about the pitch axis P, and thus control can be simplified.

The wind turbine generator 1 is provided with the hydraulic brake 15 that controls the rotation of the disk 27 of the blade 7 about the pitch axis P. Accordingly, transmission of the external force and the vibration can be prevented when the actuator 11 is not in operation (in a state where the rod 10 is stopped with respect to the actuator main body 9).

The present invention is not limited to the embodiments described above, and various changes in form and details may be made therein without departing from the spirit and scope of the present invention.

In the wind turbine generator 1, the spherical bearing 26 does not necessarily have to be disposed in the tip end portion 44a of the spline nut 44. The spherical bearing 26 may be disposed in tip end section of the casing 38.

In the wind turbine generator 1, the base end section that is one side of the actuator main body 9 is fixed to the rotor head 6, and the tip end section that is the other side of the actuator main body 9 is supported by the rotor head 6 via the spherical bearing 26. However, the present invention is not limited thereto. The spherical bearing 26 may be disposed in the base end section of the rotor head main body 22. In this case, the tip end section that is one side of the actuator main body 9 is fixed to the rotor head 6. Also, the base end section that is the other side of the actuator main body 9 is supported by the rotor head 6 via the spherical bearing 26.

The wind turbine generator 1 does not necessarily have to use the ball as the rolling element for the ball screw 33 and the ball spline 34. A rolling element other than the ball, such as a columnar roller and a roller, may be used.

REFERENCE SIGNS LIST

1 WIND TURBINE GENERATOR
2 TOWER
3 NACELLE
5 MAIN SHAFT
6 ROTOR HEAD
7 BLADE
8 PITCH AXIS ROTATION MECHANISM
9 ACTUATOR MAIN BODY
10 ROD
11 ACTUATOR
12 LINK STRUCTURE
26 SPHERICAL BEARING
29 LINK BAR
32 MOTOR
33 BALL SCREW
34 BALL SPLINE
C AXIS OF MAIN SHAFT
P PITCH AXIS
M LENGTH ADJUSTMENT MECHANISM

The invention claimed is:

1. A wind turbine generator comprising:
a nacelle that is disposed on a tower;
a rotatable main shaft that is disposed in the nacelle;
a rotor head that is disposed at a tip end of the main shaft and projects from the nacelle;
a plurality of blades that radially protrude from the rotor head about an axis of the main shaft; and
a pitch axis rotation mechanism that is provided in the rotor head to rotate the blade about a pitch axis,
wherein the pitch axis rotation mechanism includes:
  an actuator that has an actuator main body which is supported by the rotor head, and a rod that extends from the actuator main body, the actuator main body being configured to move the rod along the axis of the main shaft; and
  a link structure that links the rod to the blade, and
wherein the actuator extends on the axis of the main shaft.

2. The wind turbine generator according to claim 1,
wherein one side of the actuator main body is fixed to the rotor head, and
wherein the other side of the actuator main body is supported by the rotor head via a spherical bearing.

3. The wind turbine generator according to claim 2,
wherein the spherical bearing is capable of moving in a radial direction of the main shaft, and
wherein the spherical bearing is capable of moving linearly along the axis of the main shaft, relative to the rotor head.

4. The wind turbine generator according to claim 1,
wherein the actuator main body includes:
  a motor;
  a ball screw that converts energy of a rotational motion of the motor into energy of a linear motion along the direction of the axis of the main shaft; and
  a ball spline that is linked to the ball screw to linearly guide the rod in the direction of the axis of the main shaft with respect to the actuator main body.

5. The wind turbine generator according to claim 1,
wherein the link structure includes:
  a link bar that links a tip end section of the rod to a base end section of the blade, and has a length adjustment mechanism.

* * * * *